United States Patent [19]

Detrick et al.

[11] Patent Number: 5,161,829
[45] Date of Patent: Nov. 10, 1992

[54] SECURITY PAPER AND METHOD OF MANUFACTURING THE SAME

[75] Inventors: Richard W. Detrick, Midlothian, Va.; Robert Patterson, Neenah; Kim W. Robinson, Menasha, both of Wis.

[73] Assignee: James River Corporation of Virginia, Richmond, Va.

[21] Appl. No.: 845,791

[22] Filed: Mar. 9, 1992

Related U.S. Application Data

[63] Continuation of Ser. No. 549,420, Jul. 6, 1990, abandoned, which is a continuation of Ser. No. 507,792, Apr. 12, 1990, abandoned.

[51] Int. Cl.$^5$ ............................................. B42D 15/00
[52] U.S. Cl. ...................................... 283/91; 283/72; 283/85; 283/87; 283/113; 283/901; 428/916; 156/277; 162/103; 162/134; 162/140
[58] Field of Search ................ 283/72, 82, 83, 91, 283/113, 901, 85, 87; 162/103, 134, 140; 156/277; 428/915, 916

[56] References Cited

U.S. PATENT DOCUMENTS

| | | | |
|---|---|---|---|
| 28,370 | 5/1860 | Howell, Jr. | 283/111 |
| 210,497 | 12/1868 | Casilear | 162/140 |
| 672,582 | 4/1901 | Affeltranger et al. | 162/124 |
| 1,929,828 | 10/1933 | Schlitz | 283/193 |
| 2,019,845 | 11/1935 | Colbert et al. | 162/124 |
| 2,384,667 | 9/1945 | Dowd | 283/901 |
| 2,711,120 | 6/1955 | MacLaurin | 162/110 |
| 3,746,606 | 7/1973 | Chao | 283/82 |
| 3,880,706 | 4/1975 | Williams | 162/103 |
| 3,988,571 | 10/1976 | Blair et al. | |
| 4,186,943 | 2/1980 | Lee | 283/113 |
| 4,437,935 | 3/1984 | Crane, Jr. | 162/103 |
| 4,462,867 | 7/1984 | Fuller | 162/103 |
| 4,480,177 | 10/1984 | Allen | 283/72 |
| 4,496,961 | 1/1985 | Devrient | 346/206 |
| 4,504,357 | 3/1985 | Holbein et al. | 162/123 |
| 4,534,398 | 9/1985 | Crane | 162/103 |
| 4,552,617 | 11/1985 | Crane | 162/103 |
| 4,652,015 | 3/1987 | Crane | 283/91 |
| 4,761,205 | 8/1988 | Crane | 162/103 |
| 4,763,927 | 8/1988 | Schneider | 283/83 |
| 4,816,321 | 3/1989 | Pickering | 428/199 |
| 4,816,322 | 3/1989 | Pickering | 428/199 |
| 4,941,687 | 7/1990 | Crane | 283/91 |

FOREIGN PATENT DOCUMENTS

| | | |
|---|---|---|
| 16595 | 12/1881 | Fed. Rep. of Germany . |
| 244479 | 3/1912 | Fed. Rep. of Germany . |
| 696673 | 9/1953 | United Kingdom ........ 283/91 |

OTHER PUBLICATIONS

"Desktop forgery," Forbes Inc., pp. 246–254, Nov. 27, 1989.
"Forgery in the Home Office," TIME, pp. 69–71, Mar. 26, 1990.
"Counterfeiting Trends and Deterrent Measures," by Committee on U.S. Currency, National Materials Advisory Board, 1987.

*Primary Examiner*—P. W. Echols
*Assistant Examiner*—David P. Bryant

[57] ABSTRACT

A security paper includes at least two layers of paper each having inner and outer surfaces and predetermined mechanical properties, color and optical density. Authentication indicia is printed on the inner surface of at least one layer. The indicia is formed of a chemically, mechanically and thermally stable medium having a predetermined color, color intensity and optical density. A chemically, mechanically and thermally stable adhesive permanently adheres the inner surfaces of the layers together. The adhesive has a predetermined color and optical density. The color and optical density of the layers, the color, color intensity and optical density of the medium and the color and optical density of the adhesive combine to render the authentication indicia detectable in transmitted light and substantially imperceptible in reflected light.

54 Claims, 4 Drawing Sheets

SECURITY PAPER AND METHOD OF MANUFACTURING THE SAME

This application is a continuation, of application Ser. No. 07/549,420, filed on Jul. 6, 1990 (now abandoned), and application Ser. No. 07/507,792, filed on Apr. 12, 1990 (now abandoned).

BACKGROUND OF THE INVENTION

1. Field of the Invention

The present invention relates to security paper for use as currency, negotiable instruments, documents representing monetary or property assets, passports, transcripts and any other document which because of its inherent value is subject to forgery, counterfeiting, etc., and relates to the method of manufacturing the security paper. In particular, the invention is directed to security paper having authentication indicia detectable in transmitted light but substantially imperceptible in reflected light.

2. Description of Related Art

A paper entitled "Counterfeiting Trends and Deterrent Measures" authored by the Committee on U. S. Currency, National Materials Advisory Board and published in 1987 discusses various options available to inhibit counterfeiting of currency, particularly in view of advances in high quality reprographic systems and advances in computer publishing capabilities. The paper enumerates various modifications to currency paper and to currency printing techniques which may be used to frustrate counterfeiters having access to modern high technology equipment. Among those considered most effective for currency use were various modifications of the paper substrate such as the incorporation of the security threads, water marks or other substrate modifications which would present authentication indicia in transmitted light but which would be invisible in reflected light.

While the paper mentioned above addressed currency counterfeiting, the need for security paper which would frustrate counterfeiting of other documents such as negotiable instruments, stock and bond certificates, invoices, labels, receipts, passports, property title, transcripts, licenses, lottery tickets, coupons and the like is evident. Modern computers, desktop publishing systems, optical scanners and photocopiers present forgers with a previously unavailable opportunity to reproduce illegally numerous documents having inherent value. The scope of such activities has been reported in "Desktop Forgery," Forbes, pp. 246-254 (Nov. 27, 1989), and "Forgery in the Home Office," Time, pp. 69-71 (Mar. 26, 1990). These articles indicate the urgent need for a security paper having authentication indicia which cannot be reproduced by instruments using reflected light, such as photocopiers and optical scanners.

For such security paper to effectively inhibit forgery, the authentication indicia must be substantially imperceptible not only to copying instruments using reflected light, but also to the naked eye in ambient reflected light. If authentication indicia were visible to the naked eye in reflected light, they could be placed artificially on the face of a forgery even though they were not copyable by an instrument. For authentication indicia to be effective, there must be an easy way for the authenticity of a document printed on security paper to be confirmed. This can be achieved by rendering the authentication indicia only readily visible in transmitted light.

The subject invention is directed to a security paper having authentication indicia which is not clearly visible to the eye and not reproducible by instruments using reflected light but which is detectable by being visible or optically readable in transmitted light. In a second embodiment, the authentication may be magnetically detected. The invention is also directed to the method of manufacturing the security paper which overcomes the disadvantages of the prior art processes.

SUMMARY OF THE INVENTION

In accordance with the invention, as broadly described herein, a security paper comprises a lamination of at least two layers of paper having inner surfaces permanently affixed together and an authentication indicator printed on at least one of said inner surfaces. The layers form a laminate with said authentication indicator being disposed therebetween. The authentication indicator is detectable in transmitted light and substantially imperceptible in reflected light or is detectable by other means.

The invention is also directed to a method of manufacturing composite security paper comprising the steps of providing at least two layers of paper each having an inner surface and an outer surface. An authentication indictor is printed on said inner surface of at least one of said layers. Adhesive is applied to at least one of said inner surfaces of said layers and the respective inner surfaces of said layers are adhesively joined to form a lamination. The authentication indicator is provided to be detectable in transmitted light and substantially imperceptible in reflected light or is detectable by other means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Reference will now be made in detail to the present preferred embodiments of the invention, examples of which are illustrated in the accompanying drawings.

In accordance with the invention, a security paper comprises at least two layers of paper each having an inner surface and an outer surface and predetermined mechanical properties, color and optical properties or characteristics. A number of terms may be used to explain the optical properties or characteristics of the paper and authentication indicator printed thereon.

Opacity could be utilized to describe the property wherein the paper has mechanical properties, color and thickness to be substantially impervious to the rays of reflected light while permitting detection of the authentication indicator by utilizing transmitted light. Another term to describe the optical properties or characteristics would be optical density. Optical density is defined as the degree of optical opacity of the paper which relates to the thickness of consistency and impenetrability to thus be substantially impervious to rays of reflected light while permitting detection of the authentication by utilizing transmitted light.

The use of the term reflected light relates to light that impinges upon the paper from overhead in a normal room environment or light exposed on the paper for a predetermined time interval by a photocopy or reproduction machine. The use of the term transmitted light relates to light that projects through the paper by holding the paper up to a light source and looking through the paper. An individual may use transmitted light to detect a paper watermark.

The following discussion of the invention will utilize the term optical density to describe the characteristics of the paper and the authentication indicator.

Figure 1:
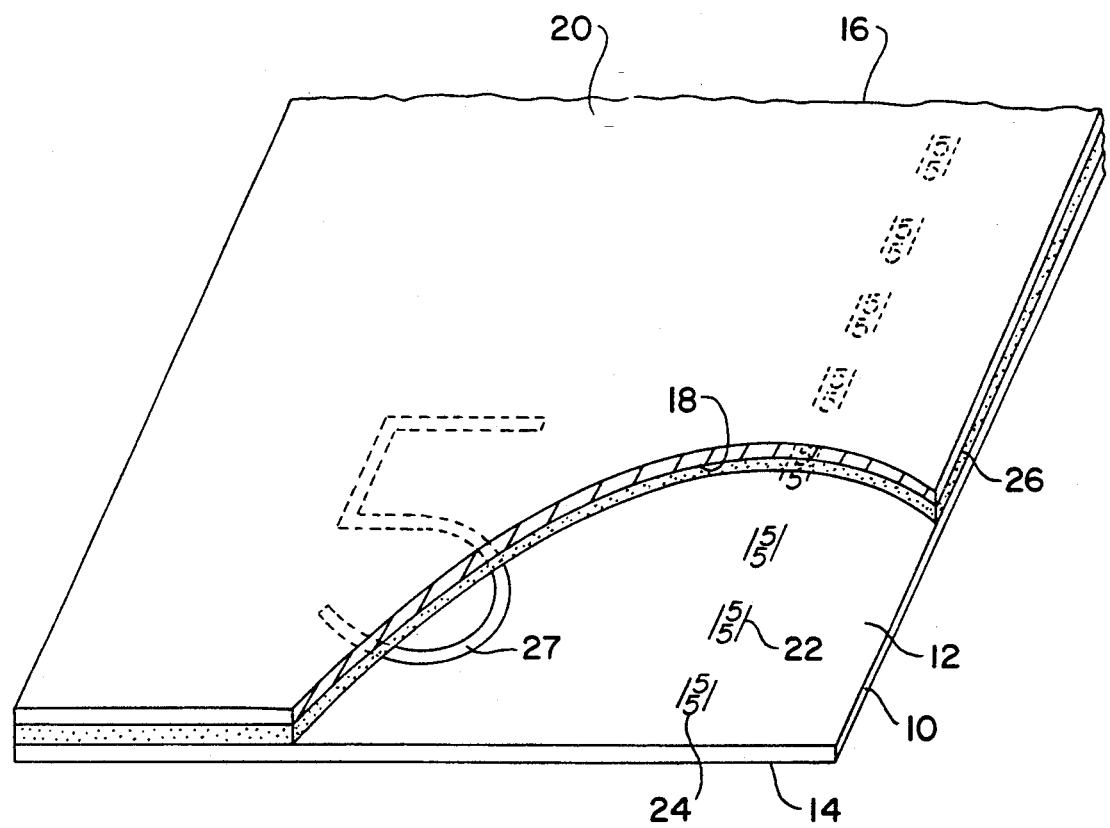
FIG. 1 is an enlarged partially cutaway perspective view of security paper manufactured in accordance with the invention.

As embodied herein and depicted in FIG. 1, the security paper comprises one layer of paper 10 having an inner surface 12 and an outer surface 14 and another layer of paper 16 having an inner surface 18 and an outer surface 20. Although the invention is described in conjunction with laminations including two layers of paper, the invention contemplates security paper structures incorporating multiple layers of paper and/or nonwoven materials laminated together.

The nature and composition of the paper layers 10, 16 may be varied depending upon the ultimate intended use of the security paper. Each layer 10, 16 may have identical mechanical properties, basis weight, color and optical density or the characteristics of each layer may be different to achieve desired or necessary effects in the resulting security paper lamination. For example, in a security paper having a basis weight of 50 pounds per ream (3000 ft$^2$), each layer 10, 16 may have a basis weight of approximately 25 pounds per ream or one layer could have a basis weight of 40 pounds per ream and the other a basis weight of 10 pounds per ream.

The characteristics of each layer of paper 10, 16, such as fold strength, tensile strength, wet tensile strength, tear strength, burst strength, optical density, and color properties will be determined based upon the desired characteristics of the resulting laminated security paper and, as for optical density and color properties, upon the desired optical relationship with the other components of the security paper.

Layers 10, 16 may be formed of lignocellulosic fiber, cotton fiber, flax fiber or other known natural and synthetic fibers and combinations thereof.

In an example of security paper of the invention intended for use as currency, each layer of paper 10, 16 is formed from a blend of cotton and linen fibers, and is size pressed on the outer surfaces 14, 20 to provide printability and feel. In this example, inner surfaces 12, 18 are not size coated, although the inner surfaces could be size coated where the selected sizing does not interfere with adhesive bonding of the layers to form the laminate.

Any known process for forming and finishing paper sheets may be used to make layers 10, 16. Preferably, a wet fibrous web is formed from a fiber slurry, dried and pressed, to form the web of paper which is eventually cut into sheets. The slurry or furnish may include a variety of additives designed to adjust the mechanical properties, the color, the optical density, the light scattering characteristics, or the light absorption characteristics of the web. Any combinations of such additives may be used to achieve the desired end result which will be dictated by the intended use of the resulting laminated security paper and the characteristics of the other components of the lamination. Additives such as dyes, pigments, sizing, retention aids, fillers, wet strength enhancers and the like may be used to adjust the mechanical characteristics, the color and the light transmission, absorption and reflection of the web.

In the example, wet or dried lap pulp comprising about 25% bleached flax fiber and the remainder cooked rags is conveyed to a standard hydropulper and slushed to approximately 6 to 7% solids. The pH may be adjusted as appropriate. The pulps are subsequently transferred to a storage chest where they are reduced to between about 3% and about 5% solids.

The pulps are then refined to promote fiber hydration and to impart fibrillation. Various types of refining may be used. In this example, the pulp is refined in a series of cycles. The refining steps will vary depending upon the fiber involved, the desired end strength of the paper, and other known factors affected by refining. It is known, for example, that highly refining pulp increases the light transmission characteristics of the resulting paper. In order to obtain the required optical density, pulp refining, among other processing steps, must be adjusted to achieve the desired light scattering and transmission characteristics without compromising the necessary paper strength.

Manufacture of the paper webs for the example discussed above proceeds on a paper machine. Wet strength additive is added to the furnish to improve durability and launderability of the product. Sufficient water is added to the furnish to ensure good formation on the wire. Using standard paper making techniques, the webs of paper 10, 16 are formed at a basis weight approximately half that of the intended security paper laminate.

The paper web may be size press treated on one or both surfaces with treatments that include binders, fillers, viscosifiers, plasticizers, pH modifiers and the like to further enhance the paper properties. In the example, the outer surface of each layer is press sized; preferably the outer surface of the layer is the wire side. The size press formulation in this example contains a binder such as animal glue, a plasticizer such as glycerine or urea, and a cross-linker such as melamine formaldehyde.

In accordance with the invention, authentication indicia are printed on the inner surface of at least one layer of paper, the indicia being formed of a chemically, mechanically and thermally stable medium having a predetermined color, color intensity and optical density. As depicted in FIG. 1, an authentication indicator 24 includes indicia 22 disposed on an inner side 12 of sheet 10. The indicia 22 is printed in chemically, mechanically and thermally stable ink having a predetermined color, color intensity and optical density.

While the term indicia is plural, and indeed in most instances more than one indication of authenticity would be used, the term as used herein is intended to encompass a single indication of authenticity where the context permits. The invention contemplates any indicia which can be printed on the surface of a finished layer of paper, preferably in ink, although other media may be used, and preferably printed by a rotating cylindrical printing plate for economy and efficiency of production.

Figure 4:
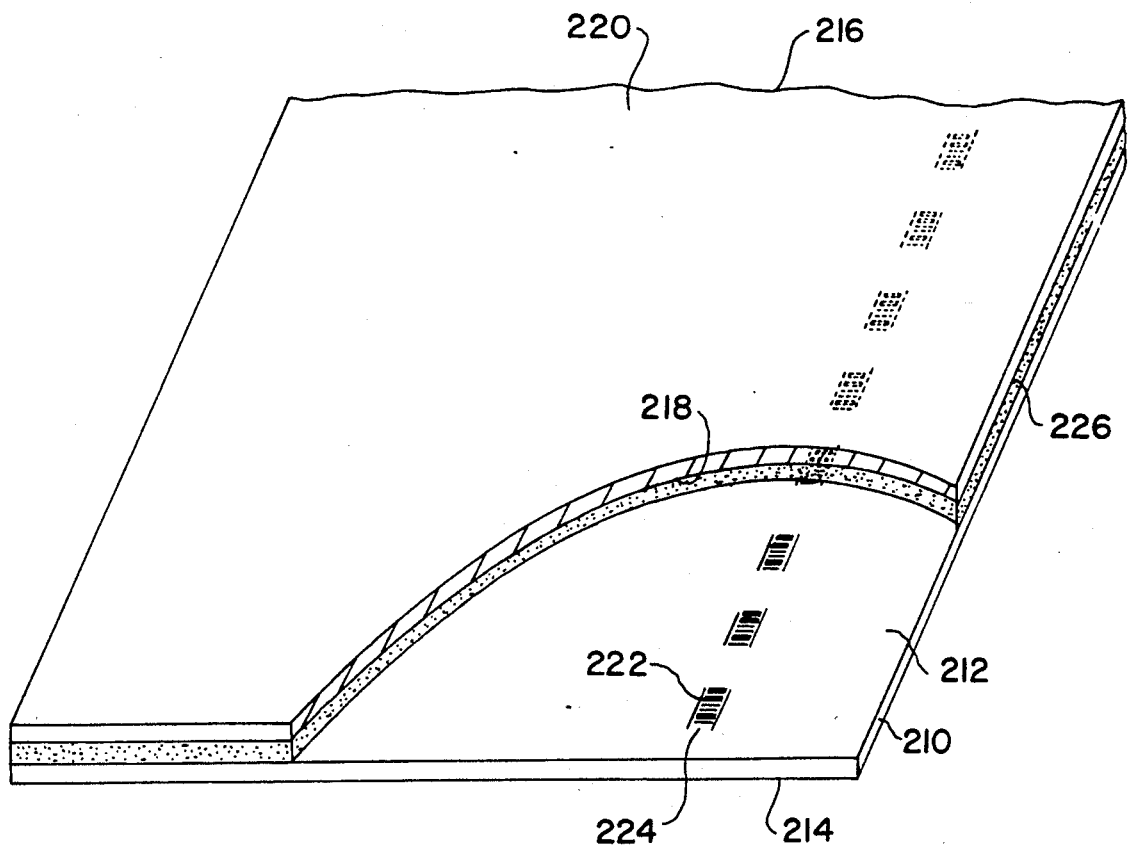
FIG. 4 is an enlarged partially cutaway perspective view of a third embodiment of the present invention wherein the authentication is a Universal Product Code (UPC).

The indicia may take the form of graphics, such as the large numeral 27 depicted in FIG. 1, pictures, logos, stripes, optically readable bar codes, as illustrated in FIG. 4, and other desirable patterns and shapes. The indicia may include a security stripe, with or without microcharacters, which is disposed in a predetermined spaced relation to at least one edge of the security paper. Ink may be used to print half-tone graphics which when viewed in transmitted light may have the appearance of a watermark. Indeed, in combination with other indicia printed in ink or other similar media, graphics similar to watermarks may be printed on the paper sheet by using oil or other chemical treatments as the printing medium. The printing medium may be or include materials which can be magnetically sensed or which fluoresce in the presence of ultraviolet light.

Various combinations of indicia may be printed either in one printing operation using a single plate or in a series of printing operations. The invention contemplates printing indicia on the inner surfaces of both layers of paper which when laminated together may overlap to create unique graphic patterns or may be spaced to provide two or more indicia in the lamination.

The media used to print the indicia must be sufficiently stable to resist chemical, mechanical and thermal degradation. These characteristics will depend in part on the intended use of the resulting security paper laminate. Documents such as currency, negotiable instruments, receipts, etc. which are subjected to wide use, frequent folding, spindling or other mutilation require a media which will resist such mechanical forces. Of course, to inhibit forgery, the media must resist thermal and chemical degradation. This resistance is considered sufficient if it is the same or better than the resistance of the paper to the same degradation. In such event, efforts to degrade or affect the media will sufficiently degrade the paper to make the tampering efforts evident.

The preferred medium is ink. The ink selected must have the required degradation characteristics and must be capable of being printed using the desired apparatus. The selected ink, or other media, must also be chemically and mechanically compatible with the selected paper and adhesive. The color, color intensity and optical density of the ink, or other media, will be selected as described below to achieve the desired chromatic and light absorption, transmission and reflection characteristics. Preferably, the viscosity and the color, the intensity and the optical density of the selected ink, or other media, are adjustable during the printing operation to achieve the desired characteristics.

In the example discussed above, the ink used was Permaprint ink available from the ink division of the James River Paper Company. This particular ink, which incorporates a proprietary binder system of James River, has chemical, mechanical and thermal resistance properties specifically designed for packaging of chemical specialties. Since this ink is normally formulated for surface printing applications, its performance for use in making a lamination for security paper can be improved, as will be understood by those skilled in the art, by eliminating slip additives or lubricants such as wax or silicones or similar components commonly added to provide slip and scuff resistance, but which would tend to inhibit adhesion.

In accordance with the invention, the security paper comprises chemically, mechanically and thermally resistant adhesive permanently adhering the inner surfaces of the layers together, the adhesive having a predetermined color and optical density. As depicted in FIG. 1, adhesive 26 is disposed between adjacent inner surfaces 12, 18 of layers 10, 16. As with the printing medium, the adhesive must be chemically, mechanically and thermally stable to resist degradation. The adhesive should have sufficient resistance to degradation such that any effort to chemically solubilize the adhesive, mechanically break the adhesive, thermally separate the adhesive, or otherwise de-laminate the security paper would sufficiently degrade the security paper to make the tampering efforts evident. Adhesives meeting these criteria, if properly applied, will permanently adhere the paper layers in the security paper laminate as that term is used herein. The adhesive also must be compatible with the paper and printing medium and must be capable of efficient application in the selected apparatus.

While any adhesive meeting the performance criteria may be used, preferred adhesives have chemically inert backbones and are cross-linkable to provide thermal resistance. The adhesive should have sufficient cross-link density to provide chemical and thermal resistance and should be flexible enough to avoid a brittle laminate. The adhesive may be selected from the group including carboxylated polymers, thermosetting acrylics, or N-methylol acrylamide interpolymers. The adhesive may be a thermosetting acrylic composition based on acrylic copolymers cross-linked with epoxies, melamine formaldehydes, isocyanates, or carboxylic acids; or a thermosetting composition based on acrylamide interpolymers with formaldehyde; or a carboxylated styrene butadiene polymer cross-linkable with melamine formaldehyde. Specific adhesives fitting this criteria can be formulated using Airflex 420, Airflex 421 or Vinac 281 from Air Products Company, S303-283C from Bostik, 2R001 from Swift Company, WS3352RB or 42-2151 from National Starch, 216 from Goodyear, Gen-Flo 3070 from Gen Corp., or Tylac 68414 and 68067 from Reichold Corp.

Additives may be added to the adhesive to achieve the desired color and optical density characteristics. For example, dyes or pigments may be added to affect the light transmission, reflection and absorption characteristics of the adhesive.

In accordance with the invention, the color and optical density of the layers, the color, color intensity and optical density of the medium, and the color and optical density of the adhesive combine to render the authentication indicia substantially optically imperceptible in reflected light and optically perceptible in transmitted light. The color and optical density of layers 10, 16, the color, color intensity and optical density of the ink used to print the authentication indicator 24 by using indicia 22 and the color and optical density of adhesive 26 are all selected to combine to render the authentication indicia not readily visible in reflected light, such as visible ambient light or the reflected light used in photocopiers and optical scanners.

The invention is directed to a balancing of the different light characteristics of the elements of the security paper laminate to render the indicia imperceptible in reflected light and detectable in transmitted light. Light incident on a paper laminate is subject to reflection, absorption and transmission. The greater the reflection and absorption, the more opaque the laminate appears. Reflection consists of surface reflection and diffuse reflection. Surface reflection may be adjusted by altering the exterior surface of the laminate. Diffuse reflection affects that portion of incident light which is not surface reflected but enters the paper laminate and is scattered due to refraction and internal reflection. Scattering depends upon the number of times light must pass from one refractive index to another. Scattering also affects light transmission. If light is transmitted through an object without scattering, the object generally appears transparent. Paper generally diffusely transmits light due to scattering; such diffusely transmitted light makes it appear translucent. Absorbed light is converted by the material into another form of energy. Some materials absorb light of only certain wavelengths, reflecting the remainder. In the visible light spectrum, materials which do not absorb light appear white or colorless as if transparent whereas objects which absorb all light in the visible spectrum appear gray or black. In between these extremes, materials appear to have colors within the visible spectrum depending upon the wavelength absorbed and reflected.

These basic principles are applied to achieve the desired combination of light characteristics which render the indicia in the security paper laminate imperceptible in reflected light but perceptible in transmitted light. The structure of the paper layers, for example, is adjusted to enhance scattering of diffuse reflection. The chemical contents of the paper layers are adjusted to affect light absorption and diffuse transmission. For example, dyes or pigments may be added to the paper to absorb certain wavelengths of visible light resulting in the appearance of a particular color. In one example, the paper layers may have an optical density of up to 80% and $L^*$, $a^*$ and $b^*$ values of 89.3, $-3.0$ and 11.9, respectively.

The same principles apply to the selection of the adhesive and the indicia medium. The color, color intensity and optical density of the medium and the color and optical density of the adhesive are selected to balance with the paper layers to achieve the desired effect. In the example, the medium is ink formulated to have high optical density in transmitted light and its $L^*$, $a^*$ and $b^*$ values closely matched to those of the paper layers. The selected adhesive may also have similar $L^*$, $a^*$ and $b^*$ values or the values may be adjusted, such as for example by adding dyes or pigments, to compensate for color differences between the paper and the medium.

Applying these principles with a variety of combinations of paper, adhesive and indicia media provides great flexibility in generating security paper laminates designed for particular uses and for specific authentication systems. The principles may be used to balance the optical characteristics of the security laminate with the optical characteristics of a medium printed in areas on the outer surface of the security laminate. In some documents, such as negotiable instrument, certain exterior surface areas are designated for placement of critical information, such as the amount of a check. With proper positioning of an indicia on the inner surface of a layer to correspond with the critical area on the outer surface of the laminate and proper selection of the medium for that indicia and the medium used to cover the outer areas of the laminate, the indicia would be substantially imperceptible in reflected light. However, any attempt to remove critical information, either chemically or mechanically, could result in removal of the medium on the outer surface rendering the indicia visible. Even in this example, the indicia could be perceptible in transmitted light.

A presently preferred method of manufacturing the security paper in accordance with the invention comprises the steps of providing at least two webs of paper each having inner and outer surfaces and predetermined mechanical properties, color and optical density; printing authentication indicia on the inner surface of at least one web in a chemically, mechanically and thermally stable medium having predetermined color, color intensity and optical density; applying chemically, mechanically and thermally stable adhesive to the inner surface of at least one web; adhesively joining the respective inner surfaces of the sheets in registration to form a lamination and curing the lamination.

As discussed above, the paper webs may be made using standard paper making techniques including forming a wet fibrous web from a fiber slurry and drying, pressing and curing the web to form the paper layers which are thereafter cut into sheets. The fiber slurry may include lignocellulosic, cotton, flax or other natural or synthetic fibers and various additives designed to effect the mechanical and optical properties of the paper. Also, as discussed above, a size coating may be placed on one or both sides of one or more webs.

Figure 2:
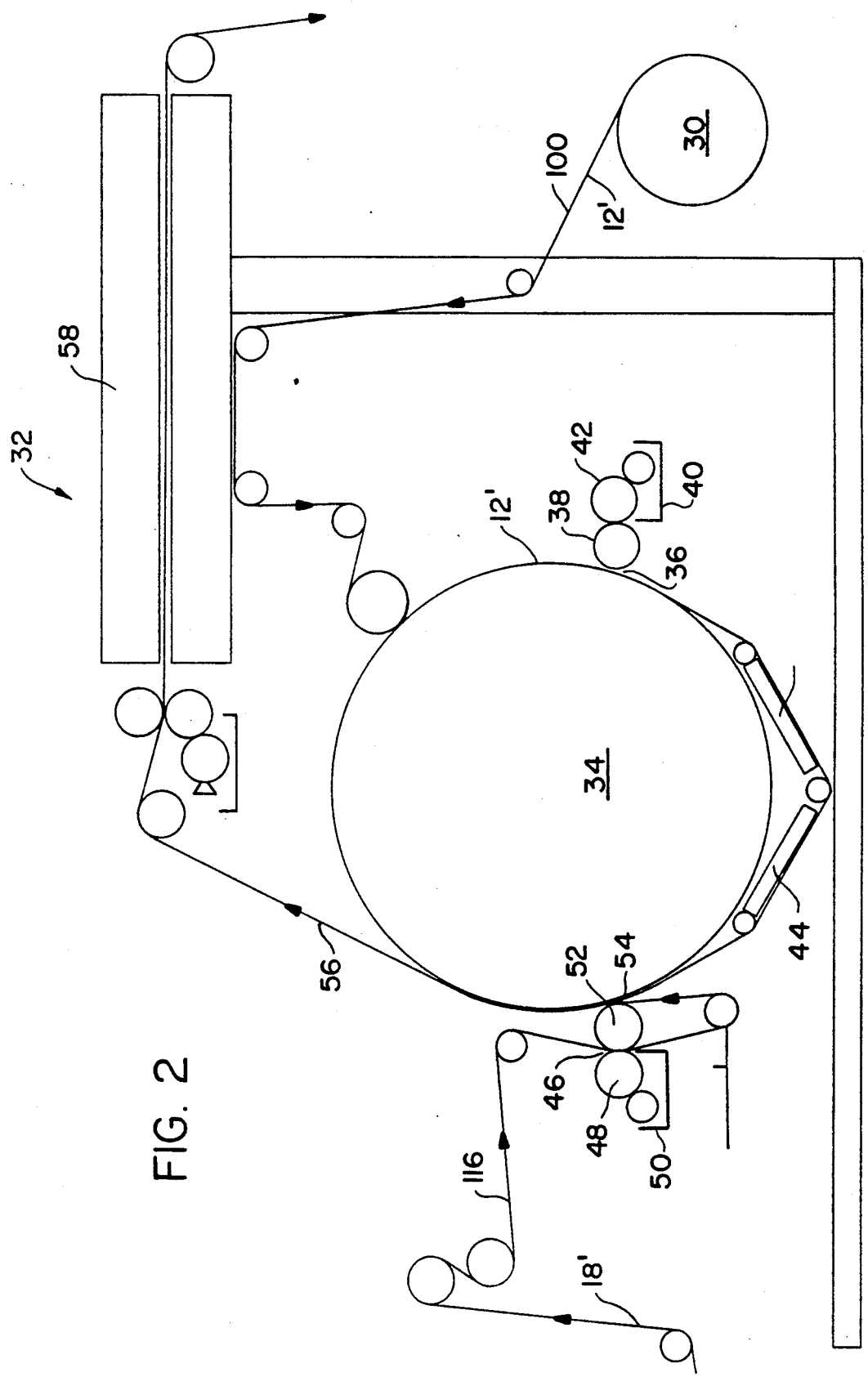
FIG. 2 is a schematic side view of an apparatus for performing the method of the invention.

A presently preferred apparatus for forming the security paper lamination of the invention is depicted in FIG. 2. Roll 30 of paper is disposed to be continuously fed in a machine direction into coater-laminator apparatus 32. Web 100 is wound on roll 30 with inner surface 12' being positioned inwardly. Web 100 is conveyed to a central impression drum 34 and then to a nip 36 defined between a printing cylinder 38 and the central impression drum 34. The inner surface 12' is disposed adjacent to the printing cylinder 38.

A printing medium, such as ink, is conveyed from reservoir 40 by anilox roll 42 to printing cylinder 38. The viscosity of the ink in reservoir 40 is preferably adjusted to a printable viscosity by adding water. The concentration of dyes and/or pigments is adjusted to achieve the desired color intensity and optical density. Anilox roll 42 preferably is etched at about 200 Q to about 360 Q.

The surface of printing cylinder 38 is designed to reproduce the desired authentication indicia onto the inner surface 12' of web 100 in a manner which compensates for paper shrinkage and in a predetermined position with respect to the cross machine edges of web 100. The web 100 is guided through the nip 36 to assure accurate placement of the authentication indicia. After printing, web 100 may be conveyed over platen heaters 44 to dry the printing.

Preferably, a second web 116 is unwound from another roll (not shown) and simultaneously fed into apparatus 32 from an opposite direction into a nip 46 defined between an anilox roll 48 and backing roll 52. Web 116 is conveyed such that an inner surface 18' is disposed adjacent to the anilox roll 48. A selected adhesive is contained in reservoir 50 and conveyed to the anilox roll 48. Anilox roll 48 preferably has an etch pattern of about 50 Q to about 95 Q and transfers adhesive at a rate of about 2 to about 12 pounds per ream of web 116, depending upon the end use requirements for the security paper laminate.

Web 116 is joined with web 100 at nip 54 defined between backing roll 52 and impression drum 34 in such a manner as to place the inner surfaces 12', 18' in contiguous registration. Preferably, the cross machine dimension of web 100 is slightly larger than that of web 116 so that web 100 extends beyond the opposed edges of the lamination to receive excess adhesive squeezed out during the joining step and to prevent adhesive from being deposited on the impression drum 34.

The formed wet lamination 56 is then conveyed to a dryer 58 and thereafter to a heated combining drum (not shown) where final lamination is effected by heat and pressure. The combining drum is heated at a predetermined temperature and imposes a laminating pressure. This final lamination step initiates cross-linking of the adhesive and irons out wrinkles in the lamination 56. After the combining drum, lamination 56 may be passed over other heated rolls and subsequently rewound. Lamination 56 may be dampened prior to rewinding to replace moisture lost during the lamination process. If the cure mechanism of the selected adhesive has a low reaction rate, the rolls of lamination may be post cured in a heated chamber.

After the adhesive has sufficiently cured for the lamination to be handled, the lamination may be slit to the finished width on a rewinder incorporating conventional electronic eye technology to ensure that the slitter blades slit the paper in registration with the authentication indicia. Thereafter, the slit rolls may be sheeted on a standard mill cutter to desired lengths. If the authentication indicia does not have to be registered in the machine direction, the sheeting step is not particularly critical. On the other hand, if the authentication indicia includes graphics which are not continuous in the machine direction, the sheeting step will require registration control to ensure print to sheet registration.

While the depicted apparatus involves printing on one surface of one layer and applying adhesive on one surface of the other layer, other alternative apparatus may be used permitting printing of authentication indicia on the inner surfaces of both sheets and applying adhesive to the inner surfaces of both layers. The latter may be appropriate where a two-part adhesive is used. Indeed, apparatus could be used which permits simultaneous printing on the outer surfaces of the paper sheets during the lamination process or sequential printing on the outer surface of the security paper after lamination. Printing of the authentication indicia may also be accomplished by means other than an inline printing process, such as, for example, offset lithograph printing or by flexographic or rotogravure printing. Also, the adhesive may be applied by many other known methods such as spraying, extrusion, flexographically, by rotogravure and by padding in addition to roll coating.

Figure 3:
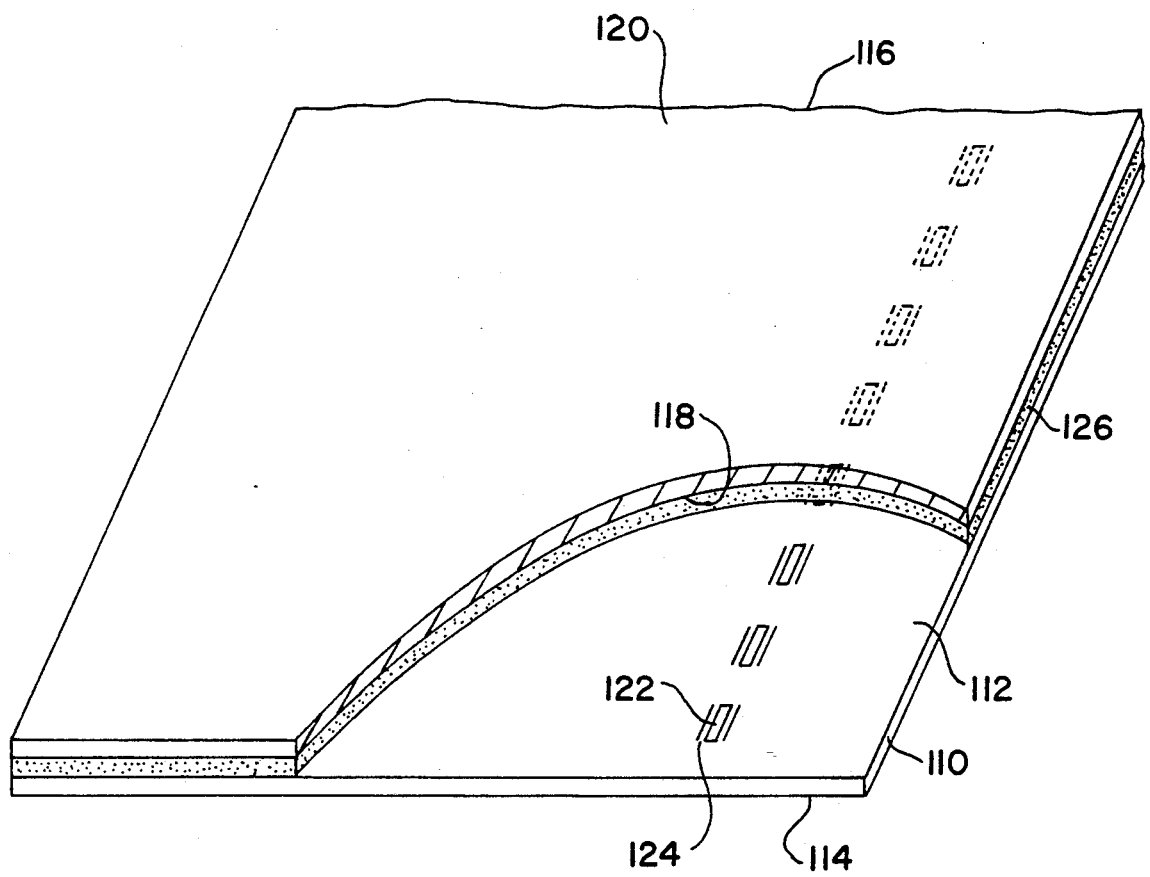
FIG. 3 is an enlarged partially cutaway perspective view of a second embodiment of the present invention wherein the authentication is magnetically detectable.

FIG. 3 is another embodiment of the present invention wherein a layer of paper 110 includes an inner surface 112 and an outer surface 114. Another layer of paper 116' includes an inner surface 118 and an outer surface 120. An adhesive material 126 is utilized to secure the inner surfaces 112, 118 together to form a laminated security paper. An authentication indicator 124 may be provided at a predetermined location on the inner surface 112 of the layer 110. The authentication indicator 124 may consist of magnetic material 122 to permit detectability and thus authenticate the security paper. The magnetic material 122 may be machine readable to enable the automatic detection, counting and authentication of the security paper.

FIG. 4 illustrates another embodiment of the present invention wherein a layer of paper 210 includes an inner surface 212 and an outer surface 214. Another layer 216 includes an inner surface 218 and an outer surface 220. Adhesive material 226 secures the layers 212 and 216 relative to each other. An authentication indicator 224 is provided for identifying the security paper. A Universal Product Code 222 may be provided as the authentication indicator 224 so as to permit automatic detection, counting and authentication of the security paper.

In addition, the security paper may be constructed to be a lamination which is opaque to visible light. The authentication indicia may be imperceptible to either reflected or transmitted light or radiation. The laminated security paper would be constructed to be translucent to non-visible light. The authentication indicator may be detectable by the non-visible light so as to be detectable in an appropriate optical instrument operating in the non-visible light wavelength.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A security paper comprising:
   a first layer of paper having an inner surface and an outer surface;
   a second layer of paper having an inner surface and an outer surface; and
   an authentication indicator disposed on an inner surface of at least one of said layers of paper;
   the inner surfaces of said layers of paper being affixed relative to each other to form a lamination with said authentication indicator being disposed therebetween said authentication indicator being indicia printed on an inner surface of one of said layers of paper, whereby said first layer of paper, said second layer of paper and said indicia are of predetermined optical density selected to enable said indicia to be detectable in transmitted light and be imperceptible on a photocopy made by utilizing reflected light.

2. The security paper according to claim 1, and further including adhesive for affixing said inner surfaces of said layers of paper together.

3. The security paper according to claim 1, wherein said authentication indicator is a magnetic material.

4. The security paper according to claim 1, wherein said authentication indicator is a universal product code.

5. The security paper according to claim 1, wherein said authentication indicator is a medium detectable by non-visible light.

6. The security paper according to claim 1, wherein said authentication indicator is a fluorescent medium.

7. A security paper comprising a lamination of at least two layers of paper having opposed surfaces permanently adhered together and an authentication indicator printed on at least one of said opposed surfaces, said layers and said authentication indicator having light scattering, absorption, reflectance and transmission characteristics for rendering said authentication indicator detectable in transmitted light and imperceptible on a photocopy made by utilizing reflected light.

8. The security paper according to claim 7, wherein said authentication indicator is perceptible to light in the visible spectrum.

9. The security paper according to claim 7, and further including adhesive for adhering opposed surfaces of said layers relative to each other.

10. A security paper comprising:
   at least two layers of paper each having inner and outer surfaces and predetermined mechanical properties, color and optical characteristics;
   authentication indicia printed on the inner surface of at least one of said layers, said indicia being formed of a chemically, mechanically and thermally stable medium having a predetermined color, color intensity and optical characteristics; and
   a chemically, mechanically and thermally stable adhesive for permanently adhering surfaces of said layers together, said adhesive having predetermined color and optical characteristics;
   the color and optical characteristics of said layers, the color, color intensity and optical characteristics of said medium and the color and optical characteristics of said adhesive being selected to render said authentication indicia detectable in transmitted light and imperceptible on a photocopy made by utilizing reflected light.

11. The security paper according to claim 10, wherein the two layers are substantially identical.

12. The security paper according to claim 10, wherein one layer of paper has a predetermined composition and the other layer of paper has a distinct composition relative thereto.

13. The security paper according to claim 10, wherein one layer of paper has predetermined mechanical properties, color and optical characteristics and the other layer of paper has distinct mechanical properties, color and optical characteristics relative thereto.

14. The security paper according to claim 10, wherein at least one of said two layers of paper is formed of natural fiber.

15. The security paper according to claim 10, wherein at least one of said two layers of paper contains synthetic fiber.

16. The security paper according to claim 10, wherein at least one of said two layers of paper includes a dye.

17. The security paper according to claim 10, wherein at least one of said two layers of paper includes a pigment.

18. The security paper according to claim 10, wherein said adhesive has greater resistance to chemical, mechanical or thermal degradation than said layers of paper.

19. The security paper according to claim 10, wherein said adhesive is thermosetting.

20. The security paper according to claim 10, wherein said adhesive is a thermosetting acrylic.

21. The security paper according to claim 10, wherein said adhesive is selected from the group consisting of carboxylated polymers, thermosetting acrylics and N-methylol acrylamide interpolymers.

22. The security paper according to claim 10, wherein said adhesive includes a pigment or dye.

23. The security paper according to claim 10, wherein said medium is at least as chemically, mechanically and thermally resistant to degradation as said layers of paper.

24. The security paper according to claim 10, wherein said medium is an ink.

25. The security paper according to claim 10, wherein said authentication indicia is printed in a first medium; and a second authentication indicia is printed in a second medium on at least one of said layers of paper.

26. The security paper according to claim 25, wherein the first and second media are the same.

27. The security paper according to claim 10, wherein said authentication indicia includes a stripe disposed in a predetermined spatial relation to at least one edge of said at least one layer.

28. The security paper according to claim 10, wherein said authentication indicia includes optically readable characters.

29. The security paper according to claim 10, wherein said authentication indicia can be sensed magnetically.

30. The security paper according to claim 10, wherein said authentication indicia fluoresces in ultraviolet light.

31. The security paper according to claim 10, wherein said authentication indicia is printed on the inner surface of one said layer in a first medium; and authentication indicia is printed on the inner surface of the other layer in a second medium.

32. The security paper according to claim 31, wherein said second medium is substantially the same as said first medium.

33. A method of manufacturing composite security paper comprising the steps of:
   providing layers of paper each having an inner surface and an outer surface;
   printing an authentication indicator on said inner surface of at least one of said layers;
   applying adhesive to a surface of said layers; and
   adhesively joining inner respective inner surfaces of said layers to form a lamination;
   said authentication indicator being indicia printed on said inner surface of at least one of said layers whereby each of said layers of paper and said authentication indicator are of predetermined optical density selected to enable said authentication indicator to be detectable in transmitted light and imperceptible on a photocopy made by utilizing reflected light.

34. The method according to claim 33, wherein said layers are webs of paper.

35. A method of manufacturing composite security paper comprising the steps of:
   providing webs of paper each including an inner surface, said webs of paper having predetermined mechanical properties, color and optical characteristics;
   printing authentication indicia on the inner surface of at least one of said webs in a stable medium having predetermined color, color intensity and optical characteristics;
   applying adhesive to a surface of said webs; and
   adhesively joining respective inner surfaces of said webs to form a lamination;
   whereby said webs, authentication indicia and said adhesive have light scattering, absorption, reflectance and transmission characteristics for rendering said authentication indicia detectable in transmitted light and imperceptible on a photocopy made by utilizing reflected light.

36. The method according to claim 35, wherein said printing step uses offset printing.

37. The method according to claim 35, wherein said printing step uses flexographic printing.

38. The method according to claim 35, wherein said printing step uses rotogravure printing.

39. The method according to claim 35, wherein said authentication indicia includes optically readable characters.

40. The method according to claim 35, wherein said medium is an ink.

41. The method according to claim 35, wherein said medium includes means for permitting said authentication indicia to be magnetically sensed.

42. The method according to claim 35, wherein said medium resists chemical, mechanical and thermal degradation at least as well as said webs.

43. The method according to claim 35, and further including the step of printing a second authentication indicia on said inner surface of one of said webs.

44. The method according to claim 35, wherein said applying step includes applying adhesive flexographically.

45. The method according to claim 35, wherein said applying step includes applying adhesive by rotogravure.

46. The method according to claim 35, wherein said adhesive is applied at a rate of about 3 pounds to about 12 pounds per 3000 ft$^2$ of said web of paper.

47. The method according to claim 35, wherein said adhesive is applied at a rate of about 3 pounds to about 7 pounds per 3000 ft$^2$ of said web of paper.

48. The method according to claim 35, wherein said adhesive is applied at a rate of about 4 pounds to about 6 pounds per 3000 ft$^2$ of said web of paper.

49. The method according to claim 35, wherein said adhesive has greater resistance to chemical, mechanical and thermal degradation than said web of paper.

50. The method according to claim 35, wherein said adhesive, includes a dye.

51. The method according to claim 35, wherein said adhesive includes a pigment.

52. A security paper manufactured by the method of claim 35.

53. A security paper comprising:

a lamination of a plurality of layers of paper, each said layer having predetermined mechanical, color and optical characteristics, said lamination including adhesive permanently adhering respective surfaces of said layers together to form said lamination, said adhesive having predetermined color and optical characteristics and having greater resistance to chemical, thermal and mechanical degradation than said layers; and authentication indicia printed in a chemically, thermally and mechanically stable medium on an interior surface of an sheet, said medium having predetermined color and optical characteristics;

the color and optical characteristics of said layers, said adhesive and said medium combining to render said authentication indicia detectable in transmitted light and imperceptible on a photocopy made by utilizing reflected light.

54. A document authentication system comprising:

a document comprising:

a lamination of a plurality of layers of paper, each layer having predetermined mechanical, color and optical characteristics, said lamination including adhesive permanently adhering respective surfaces of said layers together to form said lamination, said adhesive having predetermined color and optical characteristics and having greater resistance to chemical, thermal and mechanical degradation than said layers; and authentication indicia printed in a chemically, thermally and mechanically stable medium on at least one interior surface of at least one layer, said medium having predetermined color and optical characteristics;

the color and optical characteristics of said layers, said adhesive and said medium combining to render said authentication indicia detectable in transmitted light of a predetermined wavelength and imperceptible on a photocopy made by utilizing reflected light; and a source of light of said predetermined wavelength disposed to permit selective placement of said document in position to transmit said light therethrough.

* * * * *